United States Patent
Kwak et al.

(10) Patent No.: US 9,330,852 B2
(45) Date of Patent: May 3, 2016

(54) TANTALUM CAPACITOR AND METHOD OF MANUFACTURING THE SAME

(71) Applicant: SAMSUNG ELECTRO-MECHANICS CO., LTD., Suwon, Gyunggi-do (KR)

(72) Inventors: Sung Ho Kwak, Gyunggi-do (KR); Hun Chol Jung, Gyunggi-do (KR); Jeong Oh Hong, Gyunggi-do (KR); Sung Soo Cha, Gyunggi-do (KR); Hee Dong Myung, Gyunggi-do (KR); Hee Sung Choi, Gyunggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 105 days.

(21) Appl. No.: 14/168,908

(22) Filed: Jan. 30, 2014

(65) Prior Publication Data
US 2015/0116909 A1    Apr. 30, 2015

(30) Foreign Application Priority Data
Oct. 31, 2013   (KR) .................. 10-2013-0131104

(51) Int. Cl.
*H01G 9/042*   (2006.01)
*H01G 9/15*    (2006.01)
(Continued)

(52) U.S. Cl.
CPC ............. *H01G 9/042* (2013.01); *H01G 9/0029* (2013.01); *H01G 9/012* (2013.01); *H01G 9/08* (2013.01); *H01G 9/15* (2013.01)

(58) Field of Classification Search
CPC .......... H01G 9/042; H01G 9/15; H01G 9/025
USPC ............... 361/528, 529, 523–525, 540
See application file for complete search history.

(56) References Cited

U.S. PATENT DOCUMENTS 6,751,086 B2    6/2004  Matsumoto
7,869,190 B2 *  1/2011  Matsuoka et al. ............ 361/540
(Continued)

FOREIGN PATENT DOCUMENTS

JP    2001-110676 A    4/2001
JP    2002-203747 A    7/2002
(Continued)

OTHER PUBLICATIONS

Korean Office Action dated Jan. 29, 2015 in corresponding Korean Patent Application No. 10-2013-0131104 (English translation).
(Continued)

*Primary Examiner* — Nguyen T Ha
(74) *Attorney, Agent, or Firm* — McDermott Will & Emery LLP (57) ABSTRACT

There is provided a tantalum capacitor including: a capacitor body containing tantalum powder and having a tantalum wire exposed to one end thereof; a positive electrode lead frame including a positive electrode terminal part and a positive electrode connection part formed by upwardly bending a portion of the positive electrode terminal part from the outside toward the inside and connected to the tantalum wire; a negative electrode lead frame having the capacitor body mounted thereon; and a molded part formed to enclose the capacitor body while exposing a lower surface of the positive electrode terminal part of the positive electrode lead frame and a lower surface of the negative electrode lead frame.

9 Claims, 4 Drawing Sheets

(51) Int. Cl.
  *H01G 9/00* (2006.01)
  *H01G 9/012* (2006.01)
  *H01G 9/08* (2006.01)

(56) References Cited

U.S. PATENT DOCUMENTS

| 2007/0279841 | A1 | 12/2007 | Kim et al. |
| 2008/0080124 | A1 | 4/2008 | Kim et al. |
| 2012/0229956 | A1 | 9/2012 | Zednicek |

FOREIGN PATENT DOCUMENTS

| JP | 2005-093819 A | 4/2005 |
| JP | 2006-024691 A | 1/2006 |
| JP | 2007-324602 A | 12/2007 |
| JP | 2008-140976 A | 6/2008 |
| KR | 2002-0074339 A | 9/2002 |
| KR | 10-2008-0003011 A | 1/2008 |
| KR | 10-2008-0029203 A | 4/2008 |
| KR | 10-2012-0104122 A | 9/2012 |
| WO | 2006/124053 A1 | 11/2006 |

OTHER PUBLICATIONS

Japanese Office Action dated Sep. 1, 205 issued in Japanese Patent Application No. 2014-010406 (English translation).

* cited by examiner

TANTALUM CAPACITOR AND METHOD OF MANUFACTURING THE SAME

CROSS-REFERENCE TO RELATED APPLICATION

This application claims the benefit of Korean Patent Application No. 10-2013-0131104 filed on Oct. 31, 2013, with the Korean Intellectual Property Office, the disclosure of which is incorporated herein by reference.

BACKGROUND

The present disclosure relates to a tantalum capacitor and a method of manufacturing the same.

Tantalum (Ta) is a material widely used throughout various industrial sectors, such as in the aerospace industry and in the defense sector, as well as in the electrical, electronic, mechanical, and chemical fields, due to mechanical and physical properties such as a high melting point, excellent flexibility, excellent corrosion-resistance, and the like.

Since tantalum can form a stable anodic oxide film, tantalum has been widely used as a material in forming positive electrodes for small capacitors. Recently, in accordance with the rapid development of information technology (IT), information and communications technology (ICT) and electronics technology, tantalum has been increasingly used on a year-on-year basis.

Generally, a capacitor is a condenser temporarily storing electricity therein, and is a component in which two flat plate electrodes, disposed in close proximity to each other, are insulated from each other when a dielectric substance is inserted therebetween, and may be charged with an electric charge due to attractive force, thereby allowing electricity to be accumulated therein. Such a capacitor stores electric charges and electric fields in a space enclosed by two conductors, and is commonly used to acquire capacitance.

A tantalum capacitor containing a tantalum material has a structure in which voids are formed at the time of sintering and curing tantalum powder, and is completed by forming tantalum oxide ($Ta_2O_5$) on a tantalum surface using an anodic oxidation method, forming a manganese dioxide ($MnO_2$) layer, an electrolyte, on the tantalum oxide layer acting as a dielectric substance, forming a carbon layer and a metal layer on the manganese dioxide layer to form a body, forming positive and negative electrodes on the body for being mounted on a circuit board, and forming a molded part.

A tantalum capacitor according to the related art uses a structure in which an internal lead frame is used or a terminal is exposed to the outside without a frame in order to connect the tantalum material and the electrodes.

In the case of the structure using the internal lead frame, a space occupied by tantalum material in the molded part is decreased by the internal lead frames configuring the positive and negative electrodes, and since capacitance is in proportion to a volume of the tantalum material, capacitance may be limited therein.

In the case of the structure in which the terminal is exposed to the outside without the frame, since a plurality of contact materials are present, contact resistance may be increased by the plurality of contact materials, such that equivalent series resistance (ESR) of the capacitor may be increased.

Further, in the case of the structure in which the terminal is exposed to the outside without the frame, since a negative electrode lead is positioned on a side of a product, a welding distance for forming a solder should be secured between the tantalum material and the negative electrode lead, such that an internal volume of the tantalum material may be decreased. Therefore, capacitance may be decreased.

A condenser containing a tantalum material is disclosed in the following Patent Document 1, but a configuration of the condenser in which a positive electrode lead frame is partially bent upwardly to thereby be connected to a tantalum wire is not disclosed therein.

RELATED ART DOCUMENT (Patent Document 1) Korean Patent Laid-Open Publication No. 2002-0074339

SUMMARY

An aspect of the present disclosure may provide a tantalum capacitor capable of implementing low equivalent series resistance (ESR) and improving capacitance.

According to an aspect of the present disclosure, a tantalum capacitor may include: a capacitor body containing tantalum powder and having a tantalum wire exposed to one end thereof; a positive electrode lead frame including a positive electrode terminal part and a positive electrode connection part formed by upwardly bending a portion of the positive electrode terminal part from the outside toward the inside and connected to the tantalum wire; a negative electrode lead frame having the capacitor body mounted thereon; and a molded part formed to enclose the capacitor body while exposing a lower surface of the positive electrode terminal part of the positive electrode lead frame and a lower surface of the negative electrode lead frame.

The capacitor body and the positive electrode terminal part of the positive electrode lead frame may have an interval of 0.03 mm to 0.5 mm.

The positive electrode lead frame may include the positive electrode terminal part and the positive electrode connection part formed integrally with each other.

The positive electrode lead frame may have a groove such that a portion of the lower surface thereof is provided with the molded part.

The positive electrode lead frame may have a first extension part in a width direction of the capacitor body.

The negative electrode lead frame may have a step such that a portion of the lower surface thereof is provided with the molded part.

The negative electrode lead frame may have a second extension part so as to increase a contact area with the capacitor body.

The capacitor body and the negative electrode lead frame may include a conductive adhesive layer formed therebetween.

The conductive adhesive layer may have a thickness of 10 μm to 70 μm.

The conductive adhesive layer may contain an epoxy based thermosetting resin and conductive metal powder.

According to another aspect of the present disclosure, a method of manufacturing a tantalum capacitor, the method may include: preparing a positive electrode lead frame having a positive electrode connection part by upwardly bending a portion of a first conductive metal plate from the outside toward the inside; preparing a negative electrode lead frame formed of a second conductive metal plate; disposing the positive and negative electrode lead frames to face each other in parallel; mounting a capacitor body on the negative electrode lead frame, the capacitor body containing tantalum powder and having a tantalum wire exposed to one end thereof, and connecting the tantalum wire of the capacitor body to the positive electrode connection part of the positive electrode lead frame; and forming a molded part by molding a circumference of the capacitor body with a resin so that a lower surface of the positive electrode terminal part of the positive electrode lead frame and a lower surface of the negative electrode lead frame are exposed.

The positive electrode lead frame may have a groove in a portion of the lower surface thereof, such that the molded part is formed while filling the groove with the resin at the time of resin molding.

The negative electrode lead frame may have a step at a portion of the lower surface thereof, such that the molded part is formed while filling the step with the resin at the time of resin molding.

The method may further include applying a conductive adhesive to the upper surface of the negative electrode lead frame to form a conductive adhesive layer before the mounting of the capacitor body on the upper surface of the negative electrode lead frame.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Further, in exemplary embodiments, for convenience of explanation, a surface of the capacitor body in a direction in which a tantalum wire is exposed therefrom is referred to as the front of the capacitor body, a surface of the capacitor body in a direction opposite thereto is referred to as the rear of the capacitor body, surfaces of the capacitor body in a direction vertically intersecting with the front and rear of the capacitor body are referred to as both sides of the capacitor body, and surfaces of the capacitor body in a thickness direction are defined as an upper surface and a lower surface (or a mounting surface) of the capacitor body.

Figure 1:
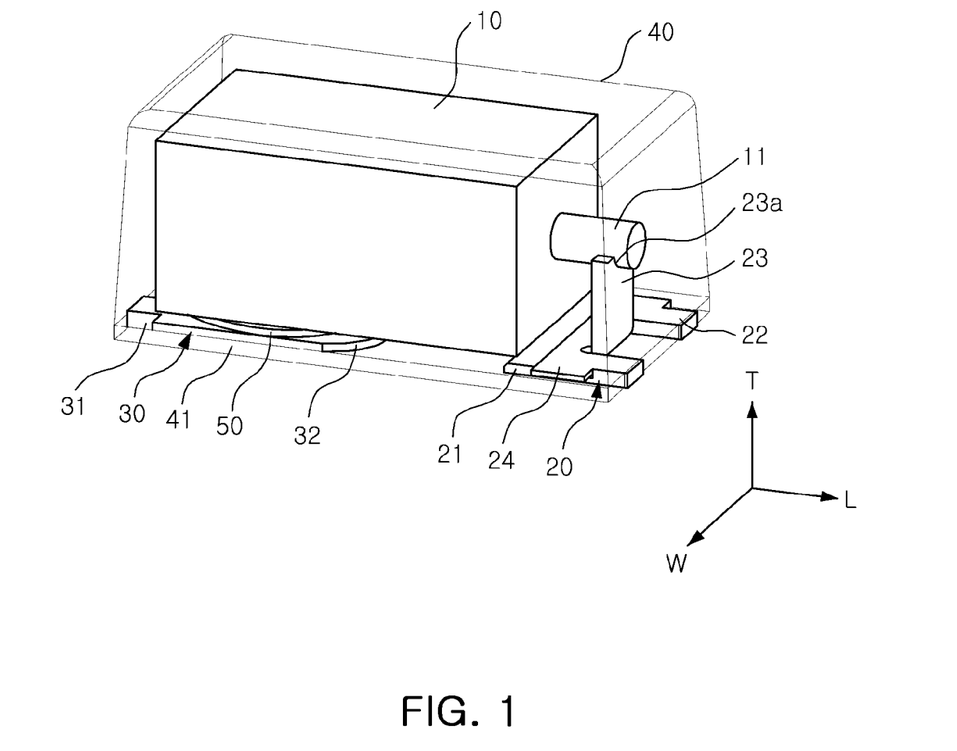
FIG. 1 is a transparent perspective view schematically illustrating a tantalum capacitor according to an exemplary embodiment of the present disclosure.
Figure 2:
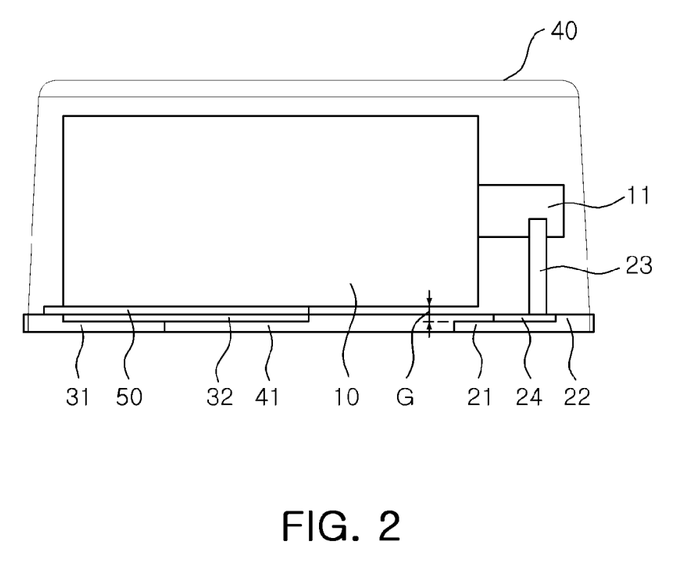
FIG. 2 is a side cross-sectional view illustrating a schematic structure of the tantalum capacitor according to the exemplary embodiment of the present disclosure.
Figure 3:
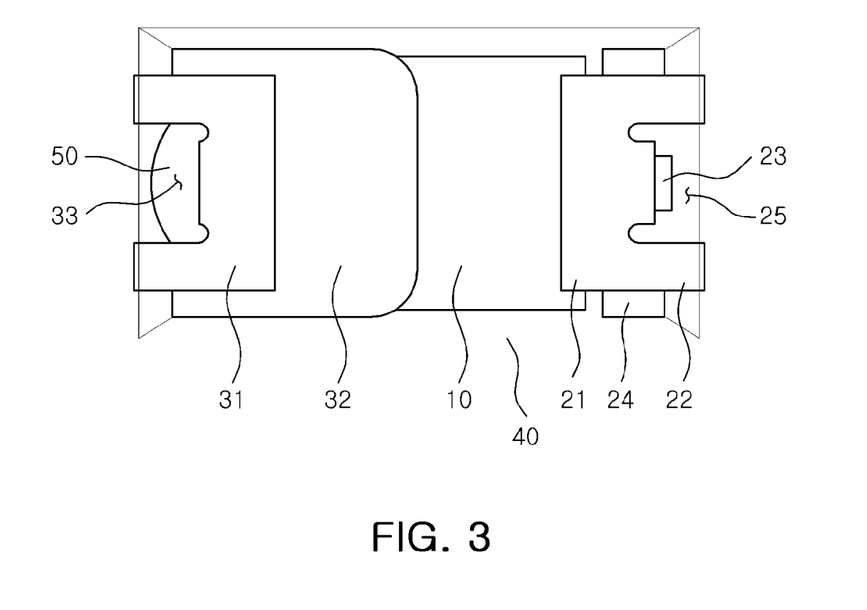
FIG. 3 is a bottom view of FIG. 1.

FIG. 1 is a transparent perspective view schematically illustrating a tantalum capacitor according to an exemplary embodiment of the present disclosure, FIG. 2 is a side cross-sectional view illustrating a schematic structure of the tantalum capacitor according to the exemplary embodiment of the present disclosure, and FIG. 3 is a bottom view of FIG. 1.

Referring to FIGS. 1 through 3, a tantalum capacitor according to this exemplary embodiment may include a capacitor body 10; a positive electrode lead frame 20; a negative electrode lead frame 30, and a molded part 40.

The capacitor body 10 may be formed using a tantalum material. For example, the capacitor body 10 may be manufactured by mixing and stirring tantalum powder and a binder at a predetermined ratio, compressing this mixed powder to form a rectangular parallelepiped, and then sintering the formed rectangular parallelepiped at a high temperature under high vacuum.

In addition, the capacitor body 10 may have a tantalum wire 11 exposed to the front thereof.

The tantalum wire 11 may be inserted into a mixture of the tantalum powder and the binder so as to be offset from the center of the capacitor body 10 before the mixture of the tantalum powder and the binder is compressed.

That is, the capacitor body 10 may be manufactured by forming a tantalum element having a desired size with the tantalum wire 11 inserted into the tantalum powder mixed with the binder and then sintering the tantalum element at about 1,000° C. to 2,000° C. under high vacuum ($10^{-5}$ torr or less) for about 30 minutes.

In this case, if necessary, carbon and silver (Ag) may be applied to a surface of the capacitor body 10.

The carbon may be provided to decrease contact resistance of the surface of the capacitor body 10, and the silver may be provided to improve electric connectivity with the negative electrode lead frame 30.

The positive electrode lead frame 20 may be formed of a conductive metal such as a nickel/iron alloy, or the like, and include a positive electrode terminal part 21 and a positive electrode connection part 23.

The positive electrode terminal part 21 may be exposed to a lower surface of the molded part 40 and be used as a connection terminal for electrical connection with another electronic product.

In this case, an interval between the capacitor body 10 and the positive electrode terminal part 21 of the positive electrode lead frame 20 may be 0.03 mm to 0.5 mm.

In the case in which the interval between the capacitor body 10 and the positive electrode terminal part 21 of the positive electrode lead frame 20 is less than 0.03 mm, a short-circuit may occur. In the case in which the interval between the capacitor body 10 and the positive electrode terminal part 21 of the positive electrode lead frame 20 exceeds 0.5 mm, a rear portion of the capacitor body 10 may be lifted, such that a portion that does not contact the negative electrode lead frame 30 may be present. In this case, the rear portion of the capacitor body 10 may be exposed to the outside of the molded part 40.

In addition, the positive electrode terminal part 21 may have a first extension part 24 having an area extended in a width direction of the capacitor body 10. The first extension part 24 may serve to increase adhesive strength with the molded part 40.

The positive electrode connection part 23 may be formed by upwardly bending a portion of a first conductive metal plate excluding a support part 22, a central portion of the metal plate in this exemplary embodiment, from the outside toward the inside, and an upper end portion 23a of the positive electrode connection part 23 may be connected to an exposed portion of the tantalum wire 11 to thereby be electrically connected thereto.

In this case, when the molded part 40 is formed by resin molding, a resin may be applied to a groove formed in the first conductive metal plate due to the bending of the positive electrode connection part 23, and thus, adhesive strength of the positive electrode lead frame 20 may be increased and cracks may be prevented.

In addition, the upper end portion 23*a* of the positive electrode connection part 23 and the tantalum wire 11 may be attached to each other, for example, by electric welding, or the like. Particularly, the electric welding may be performed by an electric spot welding method, but the present disclosure is not limited thereto.

Therefore, the positive electrode connection part 23 and the tantalum wire 11 may be stably bonded to one another, such that reliability and electrical conductivity may be improved.

In this exemplary embodiment, since the positive electrode connection part 23 is formed by bending a portion of the first conductive metal plate from the outside toward the inside, a volume of the molded part 40 corresponding to a portion of the capacitor body 10 to which the tantalum wire 11 is exposed may be significantly reduced, and a size of the capacitor body 10 may be enlarged by the reduced volume of the molded part 40, whereby volume efficiency of the capacitor body 10 may be relatively increased. In addition, a length of a current path connected from the positive electrode lead frame 20 to the negative electrode lead frame 30 may be decreased, such that ESR may be further improved.

Meanwhile, the positive electrode terminal part 21 and the positive electrode connection part 23 of the positive electrode lead frame 20 are formed integrally with each other in this exemplary embodiment, but the present disclosure is not limited thereto.

The negative electrode lead frame 30 may be formed of a conductive metal such as a nickel/iron alloy, or the like, and include a negative electrode terminal part 31 and a negative electrode connection part 32.

The negative electrode terminal part 31 may be disposed to be spaced apart from the positive electrode terminal part 21 of the positive electrode lead frame 20 in parallel with each other, and a lower surface thereof may be exposed to the lower surface of the molded part 40 to thereby be used as a connection terminal for electrical connection with another electronic product.

In this case, the negative electrode terminal part 31 may have a space part 33 at the rear thereof.

When the molded part 40 is formed by resin molding, a resin may be applied to the space part 33, and thus, adhesive strength of the negative electrode lead frame 30 may be increased.

The negative connection part 32, positioned on an upper surface of the negative electrode terminal part 31, may be flat in order to secure a bonding surface with the capacitor body 10, and the capacitor body 10 may be mounted thereon to thereby be electrically connected thereto.

In this case, the negative electrode connection part 32 and the negative electrode terminal part 31 may be formed integrally with each other or separately manufactured and adhered to each other.

In addition, the negative electrode connection part 32 may have an extended area as compared to the negative electrode terminal part 31 to thereby serve as a second extension part increasing a contact area with the capacitor body 10.

Further, the negative electrode lead frame 30 may have a step formed at a portion of the lower surface thereof.

In this exemplary embodiment, the negative electrode terminal part 31 and the negative electrode connection part 32 of the negative electrode lead frame 30 may be stepped in a vertical direction, such that the negative electrode lead frame 30 has a stepped structure, but the present disclosure is not limited thereto.

For example, the stepped structure is formed in a process of wet-etching a second conductive metal plate forming the negative electrode lead frame 30 such that the negative electrode terminal part 31 is exposed to the lower surface of the molded part 40. In the second conductive metal plate forming the negative electrode lead frame 30 by the wet-etching process, a portion exposed to the lower surface of the molded part 40 after etching may become the negative electrode terminal part 31, and a portion positioned in the molded part 40 may become the negative electrode connection part 32.

A conductive adhesive layer 50 may be formed between the negative electrode connection part 32 of the negative electrode lead frame 30 and the capacitor body 10 in order to improve adhesive strength of the negative electrode lead frame 30.

In this case, a thickness of the conductive adhesive layer 50 may be 10 μm to 70 μm. Here, 10 μm is a minimum thickness that may be generally implemented, and 70 μm is a maximum thickness preventing the generation of an exposure defect. In the case in which the thickness of the conductive adhesive layer 50 exceeds 70 μm, the conductive adhesive layer 50 may be exposed to the outside of the molded part 40. Further, the conductive adhesive layer 50 may be formed by dispensing or dotting a predetermined amount of a conductive adhesive containing, for example, an epoxy based thermosetting resin and conductive metal powder, but is not limited thereto.

In addition, the conductive metal powder may include silver (Ag), but is not limited thereto.

The molded part 40 may be formed by transfer molding a resin such as epoxy molding compound (EMC), or the like, so as to enclose the capacitor body 10.

The molded part 40 may serve to protect the tantalum wire 11 and the capacitor body 10.

In this case, the molded part 40 may be formed so that the lower surface of the positive electrode terminal part 21 of the positive electrode lead frame 20 and the lower surface of the negative electrode terminal part 31 of the negative electrode lead frame 30 are exposed.

Generally, as a volume of a capacitor body is increased in a structure of a tantalum capacitor, capacitance of the capacitor is increased, but a physical volume may also be increased, resulting in a limitation in miniaturizing a device.

In this exemplary embodiment, since the positive electrode connection part 23 of the positive electrode lead frame 20 is formed by bending a portion of the first conductive metal plate from the outside toward the inside, a volume of the molded part 40 corresponding to a portion of the capacitor body 10 in which the tantalum wire 11 is formed may be significantly reduced, and a size of the capacitor body 10 may be enlarged by the reduced volume of the molded part 40, whereby the capacitance of the capacitor may be increased.

In addition, since a solder formed between a capacitor body and a negative electrode lead frame according to the related art is omitted, the size of the capacitor body 10 may be enlarged by the area of the solder, whereby the capacitance of the capacitor may be increased.

FIGS. 4A through 4D are side cross-sectional views showing a method of manufacturing a tantalum capacitor according to an exemplary embodiment of the present disclosure.

Hereinafter, the method of manufacturing a tantalum capacitor according to an exemplary embodiment of the present disclosure will be described with reference to FIGS. 4A through 4D.

Figure 4A:
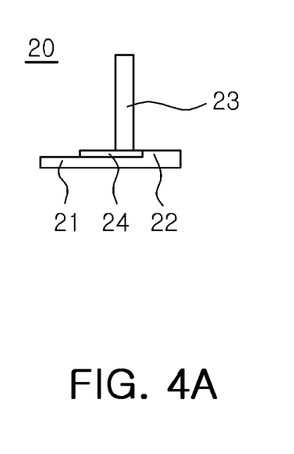
FIGS. 4A through 4D are side cross-sectional views illustrating a method of manufacturing a tantalum capacitor according to an exemplary embodiment of the present disclosure.

Referring to FIG. 4A, the positive electrode lead frame 20 including the positive electrode terminal part 21 and the positive electrode connection part 23 may be prepared using a first conductive metal plate having a flat shape.

The positive electrode connection part 23 in the positive electrode lead frame 20 according to this exemplary embodiment may be formed by upwardly bending a portion of the first conductive metal plate, that is, a central portion thereof excluding the support parts 22, from the outside toward the inside.

In this case, the upper end portion 23a of the positive electrode connection part 23 may be connected to an exposed portion of the tantalum wire to thereby be electrically connected, and the remaining portion of the first conductive metal plate excluding the positive electrode connection part 23 may form the positive electrode terminal part 21.

Meanwhile, the positive electrode terminal part 21 of the positive electrode lead frame 20 may have the first extension part 24 in order to improve adhesion strength with the molded part to be described below.

Figure 4B:
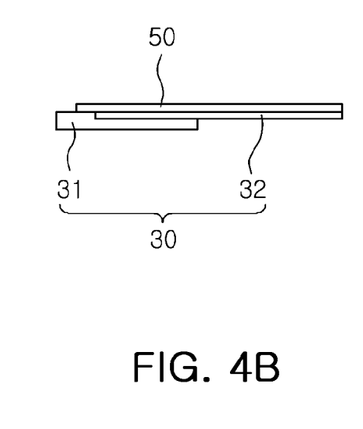

Referring to FIG. 4B, the negative electrode lead frame 30 including the negative electrode terminal part 31 and the negative electrode connection part 32 may be prepared using a second conductive metal plate having a flat shape.

In this case, the negative electrode lead frame 30 may have a step formed by wet-etching a lower surface of the second conductive metal plate.

In this exemplary embodiment, the negative electrode lead frame 30 may be divided into the negative electrode terminal part 31 and the negative electrode connection part 32 by the above-described step.

The step may allow the molded part to be partially formed on the lower surface of the negative electrode lead frame 30 at the time of molding the circumference of the capacitor body to be described below using a resin, whereby adhesive strength between the negative electrode lead frame 30 and the molded part may be improved.

In addition, the negative electrode connection part 32 of the negative electrode lead frame 30 may be configured as a second extension part having an area wider than that of the negative electrode terminal part 31, such that a contact area between the negative electrode lead frame and the capacitor body may be increased.

As described above, in this exemplary embodiment, unlike the related art, since a process of bending or warping the conductive metal plate in order to manufacture the negative electrode lead frame is omitted, the manufacturing process may be significantly simplified.

Meanwhile, in order to secure soldering stability at the time of being mounted on a substrate, the positive electrode lead frame 20 and negative electrode lead frame 30 may be formed so that the exposed lower surfaces of the positive electrode terminal part 21 and the negative electrode terminal part 31 are symmetrical with respect to each other.

Figure 4C:
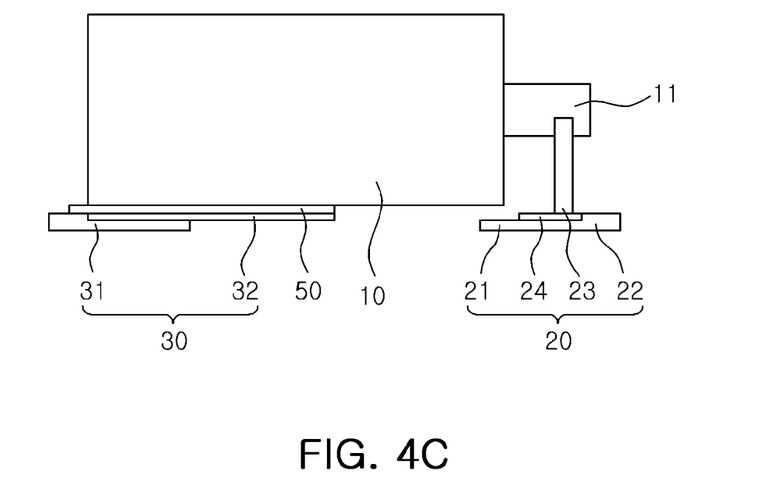

Referring to FIG. 4C, the positive and negative electrode lead frames 20 and 30 may be disposed to face each other in parallel.

In this case, if necessary, heat resistant tape (not shown) may be attached to the lower surfaces of the positive and negative electrode lead frames 20 and 30.

The heat resistant tape is provided to prevent the surfaces of the positive and negative electrode lead frames 20 and 30 from being contaminated during a molding process to be subsequently performed.

Next, the capacitor body 10 containing tantalum powder and having the tantalum wire 11 exposed to one end may be mounted on the negative electrode connection part 32 of the negative electrode lead frame 30.

In this case, the tantalum wire 11 of the capacitor body 10 may be connected to the end portion 23a of the positive electrode connection part 23 of the positive electrode lead frame 20.

That is, the tantalum wire 11 and the positive electrode lead frame 20 may be electrically connected to each other by spot welding or laser welding the tantalum wire 11 and the positive electrode connection part 23 to each other or applying a conductive adhesive in a state in which the tantalum wire 11 of the capacitor body 10 is connected to the positive electrode connection part 23 of the positive electrode lead frame 20.

Meanwhile, before the capacitor body 10 is mounted on the negative electrode connection part 32, a conductive adhesive may be applied to an upper surface of the negative electrode connection part 32 of the negative electrode lead frame 30 to thereby form the conductive adhesive layer 50, whereby adhesive strength between the capacitor body 10 and the negative electrode lead frame 30 may be improved.

In this case, a thickness of the conductive adhesive layer 50 may be 10 μm to 70 μm.

The conductive adhesive may contain an epoxy based thermosetting resin and conductive metal powder. The conductive adhesive layer 50 may be formed by dispensing or dotting a predetermined amount of the conductive adhesive, such that the capacitor body 10 and the negative electrode connection part 32 may be attached to each other. Then, a curing process may be performed at 150° C. to 170° C. for 40 to 60 minutes in a closed oven or under reflow curing conditions, such that the conductive adhesive layer may serve to allow the capacitor body 10 not to move at the time of resin molding.

In addition, the conductive metal powder may include silver (Ag), but is not limited thereto.

Figure 4D:
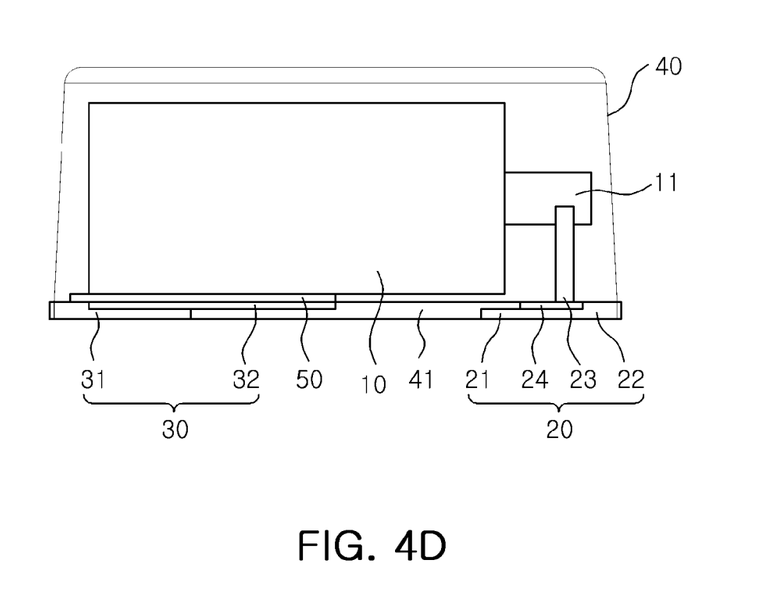

Referring to FIG. 4D, the molded part 40 may be formed by transfer molding a resin such as an epoxy molding compound (EMC), or the like, so as to enclose the tantalum wire 11 and the capacitor body 10.

In this case, the molding of the support part 22 of the positive electrode lead frame 20 may be performed after etching or stamping in order to improve a crack prevention effect at the time of forming the molded part 40.

In this case, a temperature of a mold may be about 170° C., and the temperature for EMC molding and other conditions may be appropriately adjusted according to components and a form of the EMC.

After molding, if necessary, the curing process may be performed at about 160° C. for 30 to 60 minutes in the closed oven or under the reflow curing conditions.

At this time, the molding process may be performed so that the lower surface of the negative electrode terminal part 31 of the negative electrode lead frame 30 and the lower surface of the positive electrode terminal part 21 of the positive electrode lead frame 20 are exposed to the outside.

Thereafter, when formation of the molded part 40 is completed, the heat resistant tape attached to the lower surfaces of the positive and negative electrode lead frames 20 and 30 may be removed, and a deflashing process for removing flash generated during the molding process may be further performed.

In addition, laser marking may be performed in a state in which the positive and negative electrode lead frames 20 and 30 are attached, such that the tantalum capacitor may be marked with a positive electrode direction thereof, and if necessary, the corresponding capacitance.

Further, as a subsequent process, if necessary, an aging process may be further performed.

The aging process may serve to decrease electrical distribution generated during an assembly process.

Thereafter, in order to form a chip electrode according to the design, a process of removing residual portions of the positive and negative electrode lead frames 20 and 30 may be performed, thereby finally completing the tantalum capacitor.

As set forth above, according to exemplary embodiments of the present disclosure, a length of a current path connected from a positive electrode lead frame to a negative electrode lead frame may be significantly decreased, such that ESR of a tantalum capacitor may be decreased.

In addition, since a positive electrode connection part is formed by bending a portion of the positive electrode lead frame from the outside toward the inside, a volume of a molded part in a portion in which a tantalum wire of a capacitor body is formed may be significantly reduced, where a size of the capacitor body may be enlarged by the reduced volume of the molded part, and capacitance of the capacitor may be increased.

In addition, since a solder formed between the capacitor body and the negative electrode lead frame according to the related art is omitted, the size of the capacitor body may be enlarged by an area of the solder, whereby the capacitance of the capacitor may be increased.

While exemplary embodiments have been shown and described above, it will be apparent to those skilled in the art that modifications and variations could be made without departing from the spirit and scope of the present disclosure as defined by the appended claims.

What is claimed is:

1. A tantalum capacitor comprising:
   a capacitor body containing tantalum powder and having a tantalum wire exposed to one end thereof;
   a positive electrode lead frame including a positive electrode terminal part, a positive electrode connection part formed by upwardly bending a portion of the positive electrode terminal part from the outside toward the inside and connected to the tantalum wire, and an extension part having an area extended in a width direction of the capacitor body;
   a negative electrode lead frame having the capacitor body mounted thereon; and
   a molded part formed to enclose the capacitor body while exposing a lower surface of the positive electrode terminal part of the positive electrode lead frame and a lower surface of the negative electrode lead frame.

2. The tantalum capacitor of claim 1, wherein the capacitor body and the positive electrode terminal part of the positive electrode lead frame have an interval of 0.03 mm to 0.5 mm.

3. The tantalum capacitor of claim 1, wherein the positive electrode lead frame includes the positive electrode terminal part and the positive electrode connection part formed integrally with each other.

4. The tantalum capacitor of claim 1, wherein the positive electrode lead frame has a groove such that a portion of the lower surface thereof is provided with the molded part.

5. The tantalum capacitor of claim 1, wherein the negative electrode lead frame has a step such that a portion of the lower surface thereof is provided with the molded part.

6. The tantalum capacitor of claim 1, wherein the negative electrode lead frame has a second extension part so as to increase a contact area with the capacitor body.

7. The tantalum capacitor of claim 1, wherein the capacitor body and the negative electrode lead frame includes a conductive adhesive layer formed therebetween.

8. The tantalum capacitor of claim 7, wherein the conductive adhesive layer has a thickness of 10 μm to 70 μm.

9. The tantalum capacitor of claim 7, wherein the conductive adhesive layer contains an epoxy based thermosetting resin and conductive metal powder.

\* \* \* \* \*